May 18, 1943.  P. NAPOLI  2,319,745
MIRROR
Filed Sept. 17, 1940
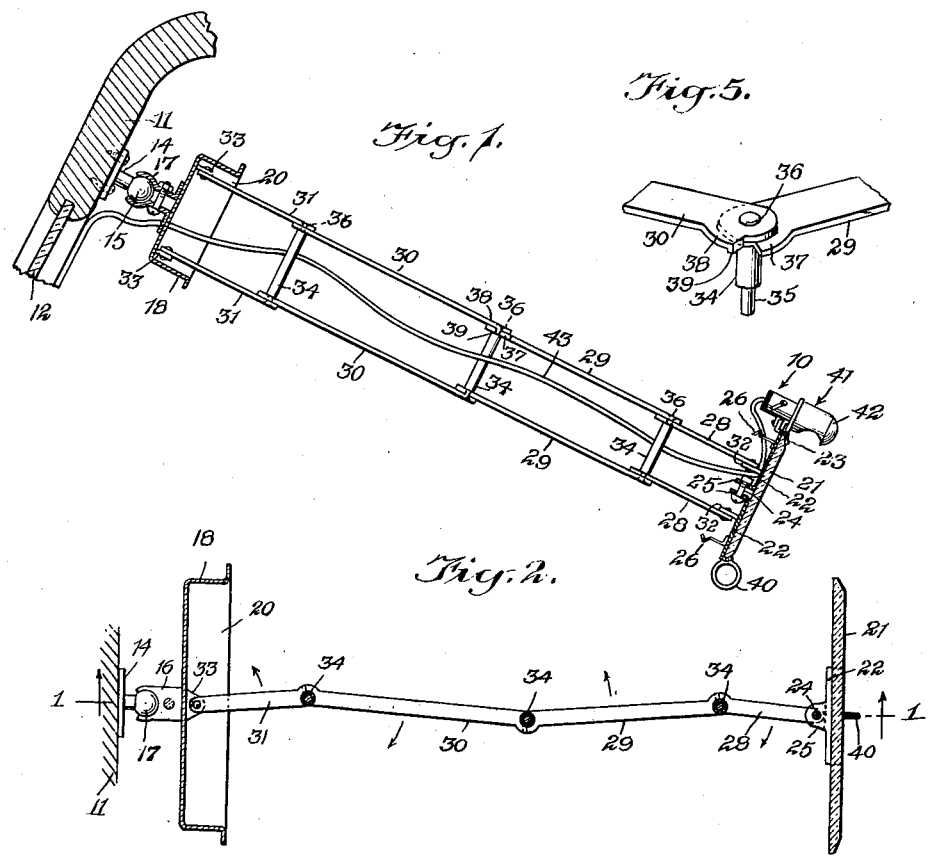
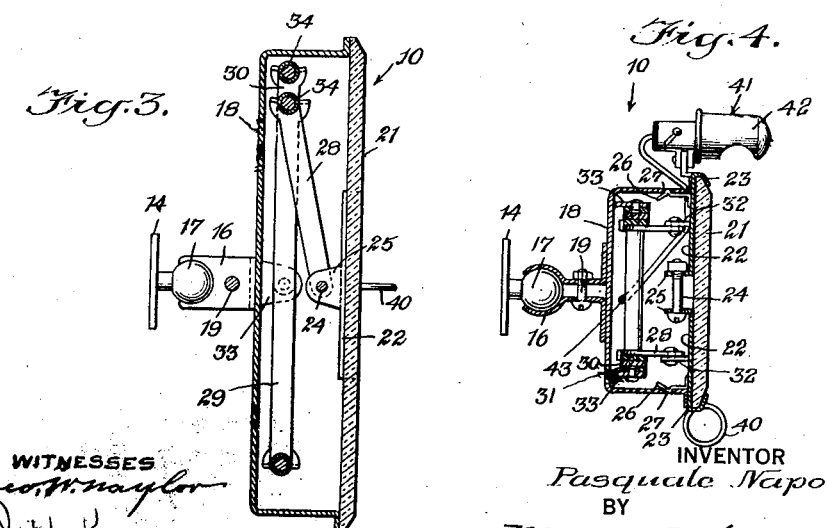
INVENTOR
Pasquale Napoli
BY
Munn, Anderson & Liddy
ATTORNEYS Patented May 18, 1943

2,319,745

UNITED STATES PATENT OFFICE 2,319,745

MIRROR

Pasquale Napoli, New York, N. Y.

Application September 17, 1940, Serial No. 357,100

2 Claims. (Cl. 88—98)

This invention relates to an improved mirror, particularly a mirror and a mirror mounting for use in connection with an automobile or other vehicle.

It is an object of this invention to provide an improved mirror and mirror mounting for use with an automobile or other vehicle which is of simplified, compact construction and attractive appearance and can be used both as a rear vision mirror and also as a personal mirror.

Automobiles are generally provided today with rear vision mirrors mounted in the interior of the car just above the windshield near the center thereof. The mirrors are provided with an adjustable mounting so that the angle of the mirror can be adjusted to present to the drive an image or reflection of the view through the rear window of the car. At times the driver or passengers of the automobile attempt to use the rear vision mirror as a personal mirror, as for instance, in applying make-up or in attempting to remove a foreign particle from the eye. Due to the inconvenient location of the mirror and also due to the poor lighting facilities at that location, the mirror is not very satisfactory for this purpose.

It is accordingly a prime object of the present invention to overcome the above problem and to provide an improved mirror which serves satisfactorily both as a rear vision mirror and as a personal mirror. In carrying out my invention, I provide an improved mirror mounting whereby the mirror may be normally supported in the usual position of a rear vision mirror, but when desired may be released from its normal position and moved towards the operator so as to bring the mirror into closer proximity of the face or person of the user.

In the accompanying drawing in which I have shown one embodiment of my invention;

Fig. 1 is a side view partly in section on line 1—1 of Fig. 2 showing a mirror in extended position;

Fig. 2 is a plan view partially in section of the mirror in extended position;

Fig. 3 is a sectional plan view showing the mirror in normal or retracted position;

Fig. 4 is a side view partially in section with a mirror in normal or retracted position; and Fig. 5 is a detailed view of one of the joints between the links which I employ in my mirror mounting.

As previously stated, my improved mirror is adapted for use in connection with motor vehicles and it is mounted in the interior of the vehicle in the usual position of a rear vision mirror. Thus in Figs. 1 and 2 my mirror is illustrated as applied to the interior of the roof 11 of a motor vehicle immediately above the windshield 12.

The support whereby the mirror is applied to the motor vehicle may be of the usual adjustable type such as the bracket 14 having a projecting stud with a ball 15 formed at the end thereof. The ball 15 is frictionally engaged at opposite sides thereof by a pair of resilient arms 16 having cup shaped portions 17 which clamped the ball. The arms 16 are in turn mounted upon a receptacle 18 and are held in clamping relationship by means of an adjustable screw 19. The bracket 14 is attached to the desired portion of the interior of the car and the receptacle 18 is supported by the bracket so that it may be adjusted through a wide range of angles. By tightening the screw 19 to the proper degree it will be appreciated that the receptacle 18 will be held at any desired adjusted position.

The receptacle 18 is open on one side thereof, i. e. the side which normally faces the rear of the car as indicated at 20. The mirror which is indicated by the numeral 21 is provided with an improved mounting whereby under normal conditions, when it is serving as a rear vision mirror, it is disposed across the open face 20 of the receptacle 18 but so that it may be released from that position and drawn towards the face or person of the user when wesired. For this purpose I provide the mirror with a pair of frame members 22 having channel shaped edges 23 which engage the top and bottom of the mirror, the frame members being held in assembled relationship by means of a small screw or bolts 24 which pass through up-turned lugs 25 formed on the adjacent ends of the members. Rearwardly projecting spring fingers 26 are attached to the frame members 22 and are positioned so that they may be projected into the receptacle 18 and will engage the upper and lower walls thereof. The receptacle and the spring fingers are provided with inter-engaging coupling members in the form of apertures in the receptacle which accommodate small projections formed in the spring fingers as indicated at 27.

Thus it will be seen that when the mirror 21 is placed across the open face of receptacle 18 it is held in position by means of the inter-engagement of the spring fingers and the receptacle. Due to the inherently resilient character of the spring fingers, the mirror may be withdrawn from the receptacle when sufficient pulling force is applied thereto.

While the mirror may be used in this manner without any additional support, I have found it advisable to provide the mirror with a mounting which will maintain it attached to the receptacle so that it will not be lost or misplaced and which will support it even when it is withdrawn from the receptacle. Different types of mountings may be employed but I prefer to use a plurality of links arranged in parallel pairs in spaced relationship as indicated at 28, 29, 30 and 31. The links 28 are pivotally connected to lugs 32 attached to the frame members 22 of the mirror. At their opposite ends links 28 are pivoted to links 29 which are pivoted to the links 30 which in turn are pivoted to the links 31. The links 31 are pivotally attached at their inner ends to lugs 33 formed in the interior of the receptacle.

So that the links may be properly folded up in the interior of the receptacle when the mirror is in normal position as shown in Figs. 3 and 4, the links 29 and 30 should be shorter than the length of the receptacle and the links 28 and 31 should be approximately one-half the length of the links 29 and 30. Thus it will be seen that the links may be folded inside the receptacle so that the mirror will fit across the open face of receptacle 18 to permit it to be used as a rear vision mirror or if desired, the links may be extended permitting the mirror to be drawn toward the face or person of the user to permit its use as a personal mirror.

The pivotal connections 36 between the links are of an improved character so as to insure the foldings of the links in opposite directions in a manner to permit them to fit within receptacle 18 and so as to prevent the pivotal connection between the links from being disposed at a dead center point. Each of the pivotal connections 34 are of similar construction, but the adjacent ones are arranged in opposite relationship so as to cause the links to fold in opposite directions. Thus it will be seen that each pivotal point consists of a rod 35 extending through the links and having a spacer collar 34 disposed thereon.

Adjacent the pivotal connections the links are formed with laterally projecting portion 37 and 38, the portion 38 being provided with a flange 39 disposed substantially at right angles to the remainder. The flange 39 serves as a stop and is in the path of movement of the end of the portion 37 so as to be engaged thereby when the links are in an extended position. The members 37, 38 and 39 are so arranged that the member 37 engages flange 39 before the connected links open to an angle of 180° and in this manner it will be seen that the pivotal connections are never disposed at dead center. Thus the mirror can always be shifted from extended to retracted position by merely applying pressure to the mirror directed towards the receptacle.

So as to facilitate shifting of the mirror, I may provide a small handle as indicated at 40 which is attached to the lower flange member 22 and which may be conveniently engaged by the finger of the user.

At times it may be desirable to apply additional illumination to the mirror, particularly where it is used as a personal mirror, and for this purpose I prefer to provide a small electric light as indicated at 41 which is of conventional type and is mounted on the upper frame 22 of the mirror. The light is preferably provided with a reflector 22 of conventional type which directs the beam downwardly on the mirror. Suitable lead wires 43 are provided for connecting the light with a source of electric current and the lead wires are preferably intertwined with the spacer collar 36 surrounding the pivotal pins.

It will thus be seen that I have provided an improved mirror of compact construction and improved appearance, which may be mounted in an automobile or other vehicle, and which serves in a satisfactory manner both as a rear vision mirror and as a personal mirror. It should be understood, of course, that modifications may be made in the illustrated and described embodiment of my invention without departing from the invention as set forth in the accompanying claims.

I claim:

1. A mirror for a vehicle comprising a reflecting member, a supporting member adapted to be attached to a vehicle in the normal position of a rear vision mirror and including a receptacle having an open side and means providing for angular adjustment thereof, and a foldable connecting device for connecting the reflecting member to the receptacle whereby the reflecting member may be shifted between a position disposed over the open side of the receptacle with the connecting device disposed entirely inside of the receptacle and a position spaced from the receptacle, said foldable connecting device being transversely rigid so as to support the reflecting member when it is spaced from the receptacle.

2. A mirror for a vehicle as set forth in claim 1 in which the connecting device consists of a plurality of links pivotally connected together.

PASQUALE NAPOLI.